United States Patent [19]

Miller

[11] 4,416,359

[45] Nov. 22, 1983

[54] ELECTROMAGNETIC CONE CLUTCH WITH BALL TORQUE BOOSTER

[75] Inventor: Donald L. Miller, Horseheads, N.Y.

[73] Assignee: Facet Enterprises, Incorporated, Tulsa, Okla.

[21] Appl. No.: 246,538

[22] Filed: Mar. 23, 1981

[51] Int. Cl.³ .................. F16D 13/75; F16D 27/10
[52] U.S. Cl. ............................ 192/54; 192/84 C; 192/111 A
[58] Field of Search ............. 192/54, 84 C, 111 A, 192/35, 93 A; 188/163, 196 V

[56] References Cited

U.S. PATENT DOCUMENTS

| | | | |
|---|---|---|---|
| 2,214,391 | 9/1940 | Weydell | 192/35 |
| 2,816,636 | 12/1957 | Weibel | 192/84 C X |
| 3,679,034 | 7/1972 | Miller | 192/111 A |
| 3,994,379 | 11/1976 | Miller et al. | 192/84 C X |
| 4,079,821 | 3/1978 | Miller | 192/54 X |
| 4,189,042 | 2/1980 | Miller | 192/84 C |
| 4,194,610 | 3/1980 | Miller | 192/84 C X |

FOREIGN PATENT DOCUMENTS

599540  3/1948  United Kingdom .................. 192/35

Primary Examiner—Rodney H. Bonck
Attorney, Agent, or Firm—Remy J. VanOphem

[57] ABSTRACT

A single surface electromagnetic cone clutch or braking device is disclosed which transmits torque from an input shaft to a drive plate member, through a plurality of spherical members, to a conical friction ring member and then to the output member. The spherical members are located in mutually opposing conical recesses within the drive plate member and an annular flange which is secured to the friction ring member. The clutch engaging forces are increased by the camming action of the spherical members in the conical recesses. The drive plate member also has a flexing member which permits the drive plate member to flex axially in order to minimize backlash noise associated with spherical balls engaging conical recesses. The armature is disposed normal to the electromagnetic winding to enable a large axially directed flex path to provide for a strong clutch engaging force. The friction ring member is threadably connected to the armature with relative movement prevented between the armature and the friction ring member by an axial wear and thread retarder member. The axial wear and thread retarder member biases the armature toward the pole faces of the electromagnetic winding. This biasing force insures that the threads in the friction ring member cooperatively engage the threads in the armature member. The biasing force of the retarder member biases the forward flank of the threads of the further ring member into engagement with the forward flank of the thread of the armature regardless of the thread clearance between the threads.

11 Claims, 5 Drawing Figures

ELECTROMAGNETIC CONE CLUTCH WITH BALL TORQUE BOOSTER

BACKGROUND OF THE INVENTION

1. Field of the Invention

The present invention relates to electrically actuated clutch and brake mechanisms, and more particularly to an electromagnetically actuated self-adjusting cone clutch with a ball torque booster.

2. Description of the Prior Art

A conventional friction clutch or brake operates on the principle of transmitting torque from an input shaft or driving member to an output shaft or driven member for frictional engagement between the two members to translate torque. Thus, in the case of a clutch, torque is rotatably transmitted from the input shaft to the output shaft. Alternatively, in the case of a brake, torque from the input shaft is absorbed by an output member.

The primary problem associated with friction clutches or brakes is that the level of torque that can be transmitted from the driving member to the driven member is limited by the friction characteristics of the two clutch surfaces, and the engaging force capable of being achieved between the two clutching members is a function of this limitation. If the engaging force is insufficient to transmit a certain level of torque from the driving member to the driven member, slippage may occur at the mating clutch surfaces in spite of the frictional characteristics of the clutch surfaces.

Typically, electromagnetically operated clutches and brakes are operated by an electromagnetic coil which serves to draw the clutching members into driving engagement by virtue of the magnetic attraction between the ferromagnetic members of the clutch. Heretofore, there have existed at least two recognizable types of electromagnetically actuated clutch constructions. One type, herein called the "cone" variation has interengaging friction surfaces between engageable rotatable clutch elements which are conically shaped. By their inherent geometrical configuration, the conical shaped surfaces require a lower axial force to develop sufficient locking of the working faces for coupled rotation between the driving and driven members. The other type of clutch, herein called the "disc" variation, has interengaging friction surfaces which are generally disposed normal to the axis of the engagable rotatable clutch elements. In the disc type designs where the flux path passes through the friction faces the armature pull is entirely axial. The disc type configuration is particularly advantageous due to the flexibility for providing a large axially directed flux path and thereby provide for a strong clutch engaging force between the driven and driving clutch members.

Several prior art designs combine the desirable characteristics of the aforementioned two types of electromagnetic type clutch constructions mentioned above. One such design provides an armature ring element which is generally L-shaped in radial cross section. The element has one annular pole piece with a frusto-conical face and another annular pole piece with a flat disc like face disposed normal to the clutch axis. This design, however, has several drawbacks. For example, since the armature ring element is one piece, there is no means for compensating for wear of either pole piece. Furthermore, the conical friction surface must be made of a magnetic material. In addition, the outer magnetic pole force is almost entirely in the radial direction instead of in the preferred axial direction. Another prior art design uses the same principle as the aforementioned prior art design except that the conical surface is threadably engaged to the disc like pole piece. This design has the added drawback of forcing the electromagnetic flux path through the threads. Designing the flux path to pass through the threads, results in a loss of the generated clutching force produced by the electromagnetic actuating components.

Another prior art design is shown in Miller, U.S. Pat. No. 3,679,034, owned by the assignee of the present application. This design provides a conical frictional element which is moved into engagement with a mutually engageable conical base on an output member by use of a resilient torque transmission member. The resilient torque transmission member provides a sufficient force to disengage the mutually engagable conical surfaces when the electromagnetic force becomes deenergized. The force of the resilient disengaging torque transmission member is in a direction opposite the direction of the force generated by the electromagnetic flux path. Therefore, out of necessity, it requires a greater electromagnetic force to engage the mutually engagable friction torque transmitting faces. Thus, as wear occurs, the electromagnetic force required to engage the frictional surfaces becomes larger in magnitude since the resilient torque transmitting member has to be deflected a greater distance. Furthermore, as wear occurs on the frictional surfaces, adverse wear occurs on the armature face as a result of the centrifugal force acting on the self-adjusting wear compensating members. The centrifugal force delays the action of the self-adjusting wear compensating members thereby permitting the pole face of the output member to come in contact with the rotating armature for a sufficient period of time to cause adverse wear before permitting wear compensation.

In a further effort to increase engagement forces between the clutch members, some prior art designs have included a ball torque boosting arrangement whereby the engagement pressure of the clutching members is increased to augment the electromagnetic engaging force. One such design is shown in U.S. Pat. No. 4,079,821 to Miller, owned by the assignee of the present application. This design is drawn to a single surface electromagnetic clutch or braking device wherein a plurality of spherical members are located in mutually opposing conical recesses between the armature and the output member. The output member abuts a thrust surface so that the armature and the spherical members, which are disposed in the corresponding pockets, cannot move apart from the output member beyond a predetermined axial position. The spherical members are kept in place between the armature and the output member by a biasing member acting on the armature. The armature is moved axially into engagement with the input means when the electromagnetic coil is energized. As the armature moves in the axial direction towards the input means, the distance between the armature and the output member will increase and the spherical members are perimitted to above along the straight sides of the conical recesses in the armature and the output member. Concurrently, after the armature begins to move axially towards the input means, the rotational velocity of the armature is increased by the dynamic condition of the input means. This relative rotational movement between the armature and the output member causes the spherical members to move along the straight surfaces of the conical recesses in both the armature as well as the output member. However, since the output member is restricted from axial movement by a retaining ring, only the armature will move axially in a direction towards the input means. The axial movement of the armature caused by the camming action between the output member and the armature results in a stronger engaging force between the armature and the input means. The engaging force is further enhanced by the face that the torque generated between the magnet body and the armature produces an equal reactive torque in the output member. Again, since the output member cannot move axially, the output member produces an equal but opposite reactive torque resulting in a further axial force which is transmitted back through the spherical members to the magnet body and becomes additive to the electromagnetic engaging force. The overall effect, then, is that the relative rotational movement between the armature and the output member will generate an axial force which is proportional to the generated torque. This axial force is added to the magnet forces, and thereby, causes a net increase in the output torque of the translating device.

While this design has many advantages over simple electromagnetic single surface clutches, namely increasing the engaging force, this design lacks the advantages of the "cone" type single surface clutch. Furthermore, this design does not utilize a friction disc at the engaging surfaces but rather utilizes metal to metal contact. In addition, this design does not provide for an axial thread wear compensation device nor does this design provide for minimizing noise which is caused by backlash of the torque input or output elements.

One prior art design utilizing the electromagnetic clutch or brake having a self-adjusting wear feature and a conical frictional element is shown in U.S. Pat. No. 3,994,379 owned by the assignee of the present application. In this design, a driving friction ring member is threadably engaged to an armature with relative motion in one direction prevented between the armature and the friction ring member by a self-adjusting thread retarder. The fingers of the retarder act upon a narrow surface on the armature to prevent relative motion in one direction between the armature and the friction ring member upon disengaging of the electromagnetic coil. The retarder member only permits the armature to rotate in one direction relative to the friction ring member, that is, as the friction surface wears away. As wear occurs and the electromagnetic coil is energized, the rotating armature and the friction ring member are moved axially toward the pole face. The rotational velocity of the armature is decreased by the static condition of the pole face. Concurrently, the friction ring member, which continues to rotate at the input shaft speed, is caused to move axially forward along the mutually engageable threads between the friction ring member and the armature toward the output member. Thus, the friction surface of the friction ring member moves axially into engagement with its mating friction surface to transmit torque.

This self-adjusting clutch or brake, however, is complex, difficult to assemble and expensive to manufacture. In addition, a substantial amount of heat is generated during the engagement of the frictional elements which causes the threaded connection between the armature and friction member to bind due to thermal expansion. To insure thread adjustment under the most severe thermal growth conditions, it has been found necessary to increase the clearance or tolerance between the threaded surfaces. However, the increased thread clearance permits the armature to drift rotatably along the threads within the friction member. Thus, the operation of the clutch or brake could become uncontrolled and erratic due to the "walking" of the armature within the thread clearance of the friction ring member. This results in the jamming of the armature against the pole faces or severe impacting of the mating frictional surfaces of the clutch or brake.

In summary, none of the above described prior art designs are designed to provide an increase of torque capacity over a single surface conical surface clutch while maintaining the desirable engaging characteristics of a single surface disc type clutch. Furthermore, none of the above designs provides for an instantaneously responding axial thread wear adjuster that prevents "jamming" or wear of the armature against the pole faces. Finally, none of the above prior art designs provide for overcoming the backlash noise associated in driving torque through spherical balls which occurs with unsteady torque inputs or outputs.

SUMMARY OF THE INVENTION

The present invention is concerned with a single surface electromagnetic clutch or braking device which enables the transmission of a significant increase in the torque normally obtained with a prior art single surface clutch. The present invention provides for this unexpected significant increase in the torque capacity over a prior art single surface clutch by combining the desirable characteristics of a single surface cone clutch with the desirable characteristics of a ball torque booster clutch. In order to reduce the backlash noise normally associated with ball torque booster clutches, the drive plate is made to deflect in order to reduce the shock that occurs with unsteady torque inputs or outputs. The present invention also provides a simple and inexpensive axial wear and thread retarder member which insures the positive location of the armature within the thread clearance of the driven member or friction plate. The axial wear and thread retarder member biases the armature within the driven member so that the armature is pushed in a direction towards the pole faces. Thus, the forward flank of the thread on the armature will be forced into engagement against the forward flank of the corresponding thread on the friction member regardless of the thread tolerance between the armature and the friction member.

The present invention relates to an electromagnetic cone friction device for torque transmission having an input means and a coaxially disposed output means. The input means includes an annular magnetic armature having a threaded outer diameter. An annular adjustable friction ring member is threadably mounted on the threaded outer diameter of the annular magnetic armature for relative motion therewith. A drive plate member is coaxially disposed with the annular magnetic armature and the annular adjustable friction ring member. The drive plate member is also mounted adjacent to the annular magnetic armature and the annular adjustable friction ring member. In addition, torque is translated from the drive plate member to the annular adjustable friction ring member. The translation mechanism includes a plurality of spherical members interposed the annular adjustable friction ring member and the drive plate member. The plurality of spherical members are adapted to simultaneously engage the drive plate member and the friction ring member to provide direct torque transmission to the output means. Furthermore, a clutch actuating mechanism for activating the torque transmitting device and for providing a circuitous flux path through the output means and the annular magnetic armature so as to transmit torque through the drive plate, through the plurality of spherical members, through the annular adjustable friction ring member to the output means, the clutch actuating mechanism further including an electromagnetic mechanism mounted in the output means for producing a circuitous magnetic flux path when energized.

It is, therefore, a primary objective of this invention to provide an improved self-adjusting single surface electromagnetic clutch or brake which combines the desirable features of a single surface cone clutch type and ball torque booster type into one friction device.

It is a further object of this invention to provide a single surface cone type clutch and ball torque booster type clutch into one device that reduces backlash noise by permitting the drive plate member to deflect when subjected to unsteady torque inputs or outputs.

It is still another object of this invention to provide a clutch with a torque capacity which is substantially greater than a single surface cone clutch while maintaining the desirable engaging characteristics of a disc clutch.

It is still another object of the present invention to provide an electromagnetic clutch or brake device which provides a substantial increase in torque capacity over prior art single surface clutches or brakes which have a simple and economical wear compensator and which reduces backlash noise.

It is still another object of the present invention to provide an electromagnetic clutch or brake that provides substantial increase in the torque capacity over prior art single surface clutches or brakes and which is not adversely affected by wear at the torque transmitting surface over long periods of time and reduces backlash noise by permitting the drive member to deflect with unsteady torque inputs or outputs.

It is still a further object of this invention to provide an electromagnetic clutch or brake which provides substantial increase in torque capacity over a prior art single surface cone clutch and in which the electromagnetic clutch engaging forces are unaffected by wear exhibited on the torque carrying members.

Another object of this invention is to provide an electromagnetic clutch or brake which has substantial increase in torque capacity over a prior art single surface clutch and one in which the torque output is not adversely affected by friction wear at the torque transmitting surfaces over long periods of time.

It is a still further object of this invention to provide an electromagnetic clutch or brake which provides substantial increase in torque capacity over a prior art single surface cone clutch and in which many different friction materials including organic materials may be used on the frusto-conical friction surface of the output member.

Other objects and advantages of this invention will become more apparent from the following detailed description taken in conjunction with the accompanying drawings.

DESCRIPTION OF THE PREFERRED EMBODIMENT

Figure 1:
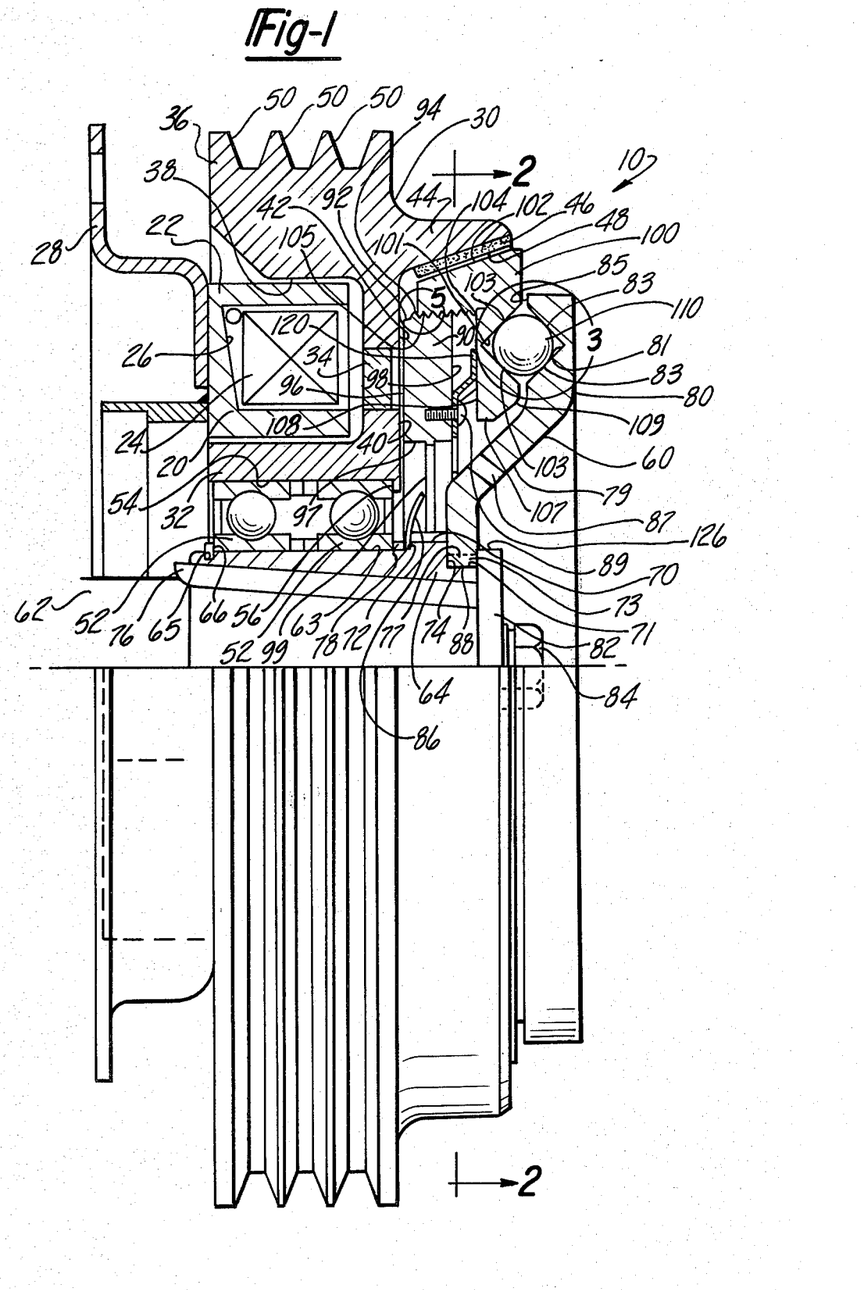
FIG. 1 is a partial sectional view of the preferred embodiment of the invention in the disengaged position.

Referring to FIG. 1, there is shown an electromagnetic friction clutch or brake assembly generally designated by the numeral 10 for transmitting torque from the input means 60 to an output means 30. The output means can be used to drive, for example, a compressor of an air conditioning system or any other device which utilizes the rotative power transferred to the output means by the input means through the friction clutch.

The electromagnetic friction clutch 10 is comprised of electromagnetic clutch actuating means 20, an input means 60 and an output means 30.

The electromagnetic clutch actuating means 20 includes a ferromagnetic housing 22 and an electromagnetic winding or coil 24. The electromagnetic winding or coil 24 is disposed within a first annular cavity 26 in the ferromagnetic housing 22 and is contained therein by any suitable adhesive, such as epoxy. The coil 24 may be manufactured from copper wire or any other suitable material and is suitably connected to a DC power source and an electrical control means (not shown). The ferromagnetic housing 22 is axially fixed and nonrotatably mounted with respect to the input shaft 62 of the input means 60 by a stationary member 28.

The output means 30 comprises three concentrically disposed sections 32, 34, 36 which form one integral rotatable body. In order to establish two separate flux conducting surfaces, the radially inner body member 32 of the output means is separated from the radially outer body member 36 by a nonconductive ring 34. The nonconductive ring 34 may be manufactured from various nonmagnetic materials, such as, stainless steel, brass, etc. This specific feature of the electromagnetic clutches, that is, establishing two poles, is a well known principle in the art and will not be discussed further.

The output means 30 is coaxially disposed with and rotatably mounted on an intermediate shaft 64. The intermediate shaft 64 is mounted for rotation with the input shaft 62 by means of a conventional keyway 76 between the intermediate shaft 64 and the input shaft 62. The output means 30 is mounted onto the intermediate shaft 64 by a pair of conventional roller bearings 52 mounted between the inner diameter 54 of the inner body member 32 and the outer diameter 63 of the intermediate shaft 64. The inner body member 32 is secured against axial movement along the intermediate shaft 64 by cooperation of a radial shoulder 56 adjacent the inner diameter 54 of the inner body member 32, a shoulder 72 on the intermediate shaft 64, a conical ring 78 abutting the resilient member 86 and one of the bearings 52 and a snap ring 66 in an 30 appropriate groove 65 with the intermediate shaft 64 abutting the other of the bearings 52. Thus, the inner body member 32 is maintained in proper alignment with the intermediate shaft 64 and the input shaft 62 and also permits the output means 30 to rotate with respect to the intermediate shaft 64 and the input shaft 62. The inner body member 32 has an inner pole face 40 which is normal to the input shaft axis and parallel and adjacent to a first face 96 of the coaxially mounted armature plate member 90. The outer body member 36 has an outer pole face 42 which is normal to the input shaft axis and parallel and adjacent to the first face 96 of the coaxially mounted armature member 90. One end of the outer body member 36 has a frusto-conical annular section 44 which cooperates to engage with the input means 60. The annular section 44 has a frusto-conical surface 46 which is tapered radially inwardly toward the central axis of the clutch device. The outer body member 36 is the principle torque transmitting member of the output means 30. Although the frusto-conical section 44 is shown in FIG. 1 as being integrally formed and a part of the outer body member 36, it is possible to form the annular section 44 from friction material and secure it to the outer body member 36. Alternatively, as is shown in the preferred embodiment, it is possible to fasten friction material 48 to the frusto-conical surface 46 of the frusto-conical section 44. The friction material 48 may be a resilient material.

The output means 30 further has an annular cavity 38 formed between the inner body member 32 and the outer body member 36 and formed so as to be generally coaxial with the input shaft 62. The ferromagnetic housing 22 which is axially fixed and nonrotatably mounted with respect to the input shaft 62 by means of a stationary member 28 is mounted in the annular cavity 38.

The outer body member 36 of the output means 30 is operatively connected to a device which utilizes the rotative power transferred by the clutch 10 such as an air conditioning compressor. As illustrated in the preferred embodiment, the outer body member 36 is formed with a plurality of grooves 50 in its outer periphery. The grooves 50 are adapted to receive, for example, conventional V-belts (not shown). The V-belts connect an air conditioning compressor (not shown) with the clutch 10. Thus, as the outer body member 36 is caused to rotate about the input shaft 62 as will hereinafter be described, the V-belts rotate thereby transferring the torque from the output means 30 to the compressor.

The input means 60 is coaxially and adjacently disposed to the output means 30. The clutch driving or input means 60 essentially includes eight elements: An input shaft 62, an intermediate shaft 64, a drive plate member 80, a resilient member 86, an armature member 90, a friction ring member 100, a plurality of spherical members 110 and a second spring or an axial wear and thread retarder member 120. The annular magnetic armature member 90 and the friction ring member 100 are coaxially disposed relative to the intermediate shaft 64. The annular magnetic armature member 90 is also slidably and rotatably mounted relative to a first step outer diameter 70 of the intermediate shaft 64. The annular magnetic armature member 90 also has an outer diameter 92 which has outer helical threads 94 formed thereon. As discussed previously, the annular magnetic armature member 90 further has a first face 96 mounted adjacent to the inner pole face 40 and the outer pole face 42 of the output means 30. In addition, the armature 90 has a counterbore 97 which forms a second face 99 which is normal to the axis of the intermediate shaft 64.

The resilient member 86 which is mounted on the intermediate shaft 64 is mounted adjacent to the second face 99 of the armature 90. The resilient member 86 thus exerts a biasing force upon the armature 90 is a direction away from the pole faces 40, 42. Thus, the biasing force of the resilient member 86 moves the armature 90 in an axial direction away from the pole faces 40, 42 when the electromagnetic winding 24 is deenergized.

The friction ring member 100 is also coaxially disposed with the intermediate shaft 64. The friction ring member 100 is generally frustoconically shaped in axial cross section and has a radially inwardly sloping outer surface 102 which is adapted to frictionally engage with the mating frictional material 48 on the sloping surface 46 of the frusto-conical section 44 of the output means 30. The annular friction ring member 100 also has an inner cylindrical surface 104 which has an inner helical thread 105 formed thereon to threadably engage with the outer helical threads 94 in the armature 90 for relative motion therewith. The threads 94, 105 can be of conventional screw thread form or ball thread form or any other conventional thread form. The annular friction ring member 100 also has an annular flange 107 which extends radially inwardly of the outermost diameter of the annular friction ring member 100. The flange 107 is also disposed normal to the inner cylindrical surface 104 of the friction ring member 100. The annular flange 107 has a first face 108 which is disposed parallel to and opposite the face 98 on the annular armature member 90. The annular flange 107 further has an opposite face 109 which is disposed normal to the intermediate shaft 64 and parallel to the first face 108.

The drive plate member 80 is coaxially disposed on the intermediate shaft 64 for rotation therewith. The drive plate member 80 is securely attached to the intermediate shaft 64 by any suitable conventional method. The drive plate member 80 is preferably secured by straight splines 77 formed adjacent to the inner diameter 88 to the intermediate shaft member 64 by means of mutually engaging straight splines 73 formed adjacent the second step outer diameter 71 of the intermediate shaft member 64. In addition, a shaft collar 82 which has an outer diameter 89 larger than the inner diameter 88 of the drive plate member 80 abuts against the drive plate member 80 as best illustrated in FIG. 1. In the alternative, the drive member is welded to the intermediate shaft 64. Thus, the drive plate member 80 abuts the second shoulder 74 on the intermediate shaft 64 which is formed between the second step diameter 71 and the first step outer diameter 70. The shaft collar 82 pushes the drive plate member 80 against the second shoulder 74 and the splines 73, 77 prevent relative rotational motion between the drive plate member 80 and the intermediate shaft 64. The shaft collar 82 is secured to the intermediate shaft 64 and to the input shaft 62 by means of a conventional threaded bolt 84 which is threaded into the end of the input shaft 62. The drive plate member 80 has a first face portion 85 which is directly adjacent but spaced away from the opposite face 109 on the annular flange 107 of the friction ring member 100. The opposite face 109 of the annular flange 107 has a plurality of cross sectional conical recesses 101 directly opposite a plurality of similar recesses 81 located in the first face portion 85 of the drive plate member 80. The conical recesses 101 have a pair of adjacent straight sides 103 which engage spherical members 110. The conical recesses 81 of the drive plate member are directly adjacent to and symmetrical to the conical recesses 101 of the friction ring member 100. The conical recesses 81 also have a pair of adjacent straight sides 83. Although the first face portion 85 of the drive plate member is mounted directly adjacent to the opposite face 109 on the annular flange 107, there is no surface contact whatsoever between the opposite face 109 and the first face portion 85. The only connection between the drive plate member 80 and the annular flange 107 on the annular friction ring member 100 is directly through a plurality of spherical members 110 circumferentially and radially spaced between the drive plate member 80 and the annular flange 107 in their corresponding conical recesses 81, 101 respectively. The annular flange 107 of the friction ring member 100 and the drive plate member 80 are at all time kept in engagement with the plurality of spherical members 110 by the biasing force of the resilient member 86 acting on the second face 99 of the annular member 90. The resilient member 86 is sufficiently biased axially along the intermediate shaft 64 to keep the armature plate member 90 a first predetermined distance axially away from the pole faces 40, 42 when the electromagnetic coil 24 is deenergized. Thus, the first face 96 of the armature plate member 90 is directly adjacent to but spaced away from pole faces 40, 42 of the output means when the electromagnetic coil 24 is deenergized. In this deenergized state, the armature plate member 90, the plurality of spherical members 110 and the annular friction ring member 100 are axially, as well as rotatably, independent of the output means 30.

As stated earlier, the drive plate member 80 is coaxially mounted to the intermediate shaft 64 so as to abut the second shoulder 74 on the intermediate shaft 64. Thus, the drive plate member 80 establishes the first predetermined axial relationship along the intermediate shaft 64 for the location of the armature plate member 90, the plurality of spherical members 110 and the friction ring member 100 with respect to the output means 30. Thus, the drive plate member 80, in effect, locates the first face 96 of the armature plate member 90 axially with respect with the pole faces 40, 42. The drive plate 80 also has a plurality of apertures 87 formed between the inner diameter 88 and the conical recesses 81 in a radially and axially extending portion 79 formed therebetween. Thus, the apertures 87 permit the drive plate 80 to flex at its periphery in order to reduce the backlash noise normally associated with ball torque booster clutches. The backlash noise is caused by unsteady torque inputs or outputs. Thus, when the clutch is subjected to an unsteady torque input or output, the periphery of the drive plate member 80 deflects relative the input shaft. This permits the spherical members 110 between the drive plate member and friction ring member to move within the conical recesses in a manner to be discussed later on herein.

Figures 2, 3, 4, 5:
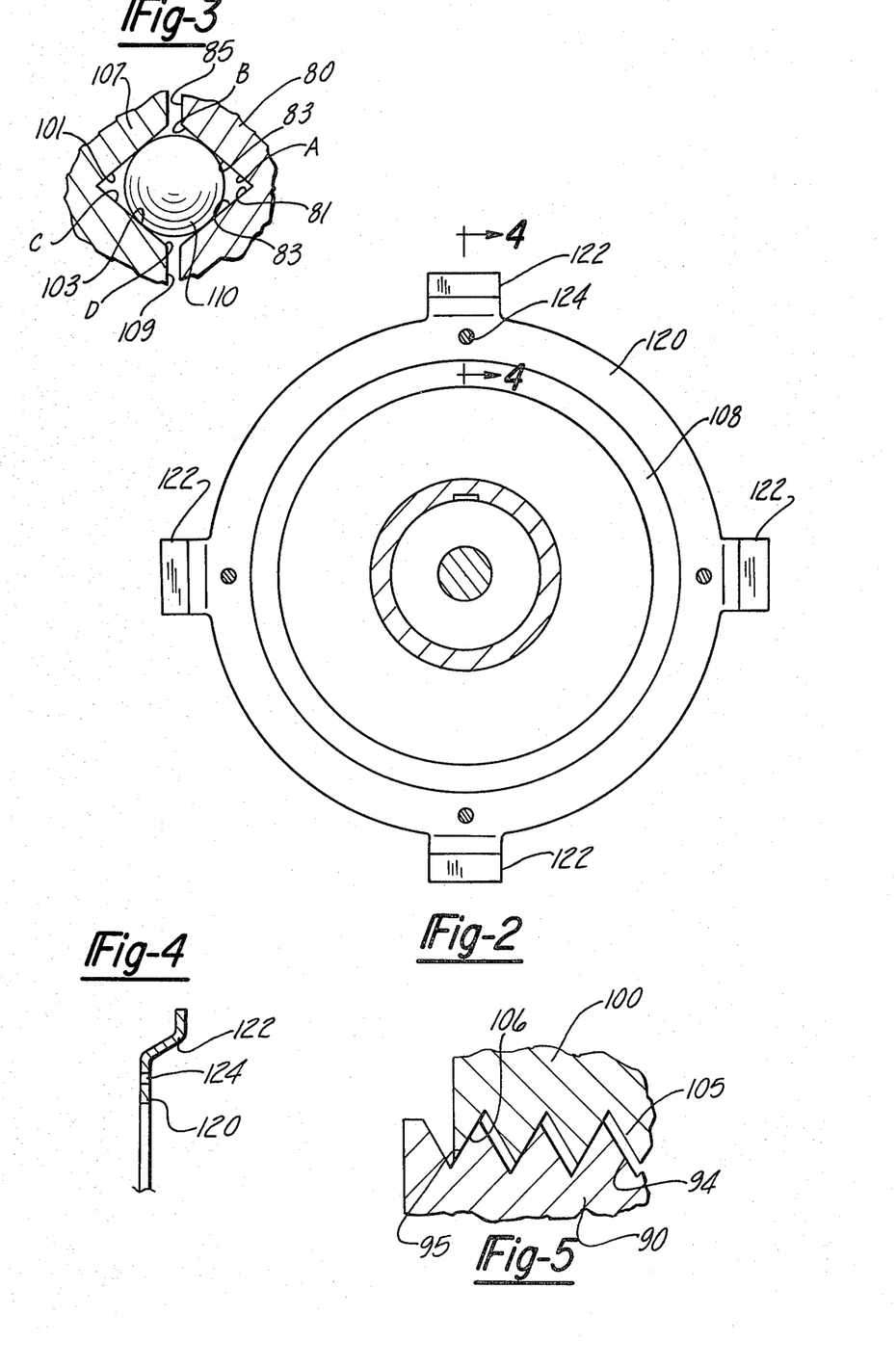
FIG. 2 is a sectional view along 2—2 of FIG. 1.
FIG. 3 is a fragmentary sectional view of FIG. 1 showing the spherical members between the drive plate member and the friction ring member.
FIG. 4 is a partial sectional view along 4—4 of FIG. 2.
FIG. 5 is a partial sectional view in the circle 5 of FIG. 1.

The plurality of the spherical members 110 are located in the symmetrically opposite conical recesses 81, 101 and are equally spaced circumferentially in the drive plate member 80 and the annular flange 107. It is preferrable that three equally spaced spherical members 110 be used, but any number of recesses and spherical members may be used in an equally spaced relationship, depending on the torque that is desired to be translated from the drive plate member 80 to the annular flange 107. FIG. 3 shows a fragmentary sectional view showing the relationship of the spherical member 110 located in their corresponding conical recesses 81, 101 respectively.

When the armature member 90 moves axially towards the pole faces 40, 42, the friction ring member 100 which is threadably engaged to the annular armature member 90, also moves axially. This also causes the opposite face 109 of the annular flange 107 to move axially with respect to the first face portion 85 of the drive plate member 80. As this occurs, the spherical members 110 will assume a position between points A to B and C to D. It should be noted that at all times, all torsional and axial forces are always translated normal to the tangent point of the straight sides or surfaces 83, 103 respectively of the conical recesses 81, 101 respectively. Therefore, the torsional and axial forces cause the spherical members 110 to be self-centering in the conical recesses 81, 101 respectively. This condition exists providing the spherical members 110 operate between points A to B and C to D. When relative movement between the drive plate member 80 and the annular flange 107 becomes so excessive as to permit the spherical members 110 to travel beyond point B or D, the torque transmission between the drive plate member 80, the spherical members 110, and the annular flange 107 will break down and the clutch can no longer be used. Similarly, when the drive plate member 80 flexes at its periphery due to an unsteady torque input or output, the spherical members will assume an off-centered position between point A to B and C to D.

Returning back to FIG. 1, the second spring or axial wear and thread retarder member 120 is mounted to the opposite face 98 of the annular armature member 90 and adjacent to first face 108 on the annular flange 107. The axial wear and thread retarder member 120 acts to create a biasing force between the annular friction ring member 100 and the armature plate member 90. The biasing force insures that the threads 94, 105 cooperatively engage one another. Thus, as shown in FIG. 5, the forward flank 95 of thread 94 will maintain contact with the forward flank 106 of the thread 105. This is a result of the thread retarder member 120 pressing the armature plate member 80 toward the pole faces 40, 42 as shown in FIG. 1. The thread retarder member 120 is secured to the face 98 of the annular armature member 90 by a plurality of fasteners 126 or any other suitable commercially available securing means through a plurality of radial holes 124 in the retarder member 120 as is shown in FIGS. 1, 2 and 4. The thread retarder member 120 further has a plurality of radial fingers 122 which are offset axially from the armature opposite face 98 to bias against the axially spaced away first face 108 on the annular flange 107. The thread retarder member 120 thus biases the armature plate member 90 axially toward the pole faces 40, 42 thereby maintaining the desired forward flank relationship between the helical threads 94 in the armature plate member 90 with respect to the helical threads 94 in the annular friction ring member 100 regardless of the thread clearance between the helical threads 94, 105 respectively.

As stated previously with reference to FIG. 1, the annular friction ring member 100 has a radially inwardly sloping surface 102 which cooperates with friction material 48 on the radial outer body member 36. The surface 102 of the friction ring member 100 engages the friction material 48 of the outer body member 36 when the electromagnetic coil 24 is energized. Thus, torque is transferred from the input shaft 62 to the intermediate shaft 64, to the drive plate member 80 through the plurality of spherical members 110 to the annular flange 107 and thence to the annular friction ring member 100 so as to transfer torque from the surface 102 to the friction material 48 on the output means 30.

Operation of the Preferred Embodiment

Prior to the energization of the electromagnetic coil 24, the first face 96 on the armature plate member 90 is positioned axially apart from the pole faces 40, 42. In addition, the surface 102 on the friction ring member 100 also remains axially spaced apart from the surface of friction material 48 on the outer body member 36 on the output means 30. When the coil 24 is energized, the armature plate member 90, which rotates with the input shaft 62 and the intermediate shaft 64, moves axially towards the pole faces 40, 42 to overcome the bias force of the resilient member 86. The magnetic engaging forces exerted on the armature 90 are completely axial and provide a closed contact between the pole faces 40, 42 and the armature plate member 90. The rotational velocity of the armature plate member 90 is decreased by the static condition of the output means 30. As the armature plate member 90 moves in an axial direction towards the pole faces 40, 42, the distance between the first face portion 85 on the drive plate member 80 and the opposite face 109 on the annular flange 107 will increase and the plurality of spherical members 110 will be permitted to move along the straight sides of the conical recesses in the annular flange 107 and the drive plate member 80. Concurrently, after the armature plate member 90 moves axially towards the pole faces 40, 42 due to the magnetic attraction, the rotational velocity of the armature plate member 90 is decreased by the static condition of the pole faces 40, 42. This relative rotational movement between the armature plate member 90 and hence the annular flange 107 on the friction ring member 100 with respect to the drive plate member 80 will cause the plurality of spherical members 110 to move along the straight sides or surfaces of the conical recesses 83, 103 respectively in both the annular flange 107 as well as the drive plate member 80. However, the drive plate member 80 is restricted from axial movement by its abutment with the second shoulder 74 of the intermediate shaft 64 and the shaft collar 82. Therefore, only the armature plate member and hence the friction ring member will move axially in a direction towards the output means. As a result of this axial movement of the armature plate member and the camming action by the plurality of spherical members 110 between the drive plate member 80 and the annular flange 107, an axial force is produced which combines with the magnetic force to increase the total engaging force between the armature plate member 90 and the pole faces 40, 42. The axial force is further enhanced by the torque generated between the output means 30 and the armature plate member 90 which produces an equal reactive torque in the drive plate member 80. Again, since the drive plate member 80 cannot move axially, the drive plate member 80 produces an equal but opposite reactive torque which produces a further axial force. This further force becomes additive to the electromagnetic clutch engaging force. Thus, the relative rotational movement between the annular flange on the friction ring member 100 and the drive plate member 80 generates an axial force which is proportional to the generated torque. This axial force then causes a net increase in the output torque that can be transmitted from the input means 60 to the output means 30. The dynamic torque output of the device 10, therefore, is increased due to the action and reactionary forces of the torque transfer through the spherical members 110 to the friction ring member 100 and then to the outer body member 36. This relationship between the output means 30, armature plate member 90, annular flange 107 on the friction ring member 100 and the drive plate member 80 is maintained until either the outer body member 36 rotates at a speed equal to that of the drive plate member 80 or until the electromagnetic winding 24 is deenergized. It is important to note that the only means of transmitting torque between the drive plate member 80 and the annular armature plate member 90 is through the plurality of spherical members 110 located in the recesses of the drive plate member 80 and the annular flange member 107. Simultaneously, as the annular armature member 90 moves into closed contact with pole faces 40, 42 of the output means 30, the annular friction ring member 100 is moved axially forward along the mutually engageable threads 94, 105 between the friction ring member 100 and the armature plate member 90, towards the surface of friction material 48 mounted to the outer body member 36 in the output means 30. The surface 102 of the friction ring member 100 attempts to move into engagement with the friction material 48 on the frusto-conical section 44. Thus, if wear has previously occured between the friction material 48 and surface 102, the friction ring member 100 threads itself along the armature plate member 90 until almost all of the torque is transferred from the input means 60 to the output means 30 through the mating of surface 102 with the friction material 48. The friction ring member 100, the plurality of spherical members 110 and the drive plate member 80, therefore, provide a direct link between the input means 60 and the output means 30.

Whenever the electromagnetic winding or coil 24 is deenergized, the armature plate member 90 and the annular friction ring member 100 are axially withdrawn from the pole faces 40, 42 under the influence of the biasing force applied by the resilient member 86. As shown in FIGS. 2, 4, and 5, upon being deenergized, the armature plate member 90 and the friction ring member 100 rotate at the same speed with relative motion between the two elements prevented due to the biasing force of the axial wear and thread retarder member 120. The fingers 122 of the thread retarder member 120 act on the first face 108 of the annular flange in such a way as to resist relative movement between the armature plate and the friction ring member. The fingers 122 bias the armature plate member 90 toward the pole faces 40, 42 as to be described later herein. Thus, the armature plate member 90 and the friction plate member 100 are maintained in exactly the same position relative to each other as in the prior energized condition unless wear of the friction material 48 occurs. Therefore, when the electromagnetic coil 24 is again energized, the armature plate member 90 and the friction ring member 100 move toward the pole faces 40, 42 simultaneously and the same basic relative interplay between the friction material 48 and surface 102 on the friction ring member is reestablished.

The fingers 122 of the retarder member 120 press on the first face 108 of the annular flange 107 so that a frictional force is developed by the fingers 122 pressing on the first face 108 only in one direction. This frictional force prevents relative movement in one direction only between the armature plate member 90 and the friction ring member 100, since the retarder member 120 will resist relative motion of the armature plate member 90 and the friction ring member 100 in the direction resulting in compression of the retarder member. The axial wear and thread retarder member 120 also causes the mutually engaging threads 94, 105 to always engage on the forward flanks 95, 106 respectively of their mutually engaging threads.

The only relative motion permitted between the armature plate member 90 and the friction ring member 100 occurs when the friction material 48 wears away. That is, as wear occurs, the wear adjuster phase as described above occurs and continues to occur until all the frictional material 48 wears away. Note that as wear occurs, there is no loss of torque between the input means and the output means. The movement between the armature plate member 90 and the friction ring member 100 is immediate and the adjustment is automatic so as to compensate for any wear that occurs in the friction material 48. The axial wear and thread member 120 also permits the threads 94, 105 respectively to be made with sufficiently large clearances or tolerances between the armature plate member 90 and the friction ring member 100 in order to compensate for thermal expansion of the threads due to the heat generated by the clutch elements during wear adjustment and engagement of the frictional elements. The axial wear and thread retarder member 120 also acts to create a biasing force between the friction ring member 100 and the armature plate member 90. Thus, the biasing force insures that the threads 94, 105 cooperate to retain mutual contact between the forward flanks 95, 106 respectively with the mutually engagable threads 94, 105 respectively when the threads have not been subjected to thermal expansion due to heat. Therefore, regardless of the thread clearance between the threads 94, 105 respectively, the forward flank 95 of the helical thread 94 will maintain contact with the forward flank 106 of the helical thread 105 as a result of the biasing force of the thread retarder member 120 pushing the armature member toward the pole faces 40, 42.

The drive plate 80 further has a plurality of apertures 87 which are formed in a radially and axially extending portion 79. This permits the drive plate 80 to flex at its periphery. The drive plate member 80 deflects relative to the input shaft 62 and the annular flange member 107 when the clutch 10 is subjected to an unsteady torque input or output. This deflection permits the spherical members 110 to move in their conical recesses 81, 101 in a manner hereinbefore described. Thus, the backlash noise normally associated with ball torque booster clutches is minimized by permitting the drive plate to flex.

While the preferred embodiment of the invention has been disclosed, it will be apparent to those skilled in the art that changes may be made to the invention as set forth in the appended claims and in some instances, certain features of the invention may be used to advantage without corresponding use of other features. Accordingly, it is intended the illustrative and descriptive materials can be used to illustrate the principles of the invention and not to limit the scope thereof.

Having described the invention, what is claimed is:

1. A torque transmitting device comprising:
   output means; and
   input means, coaxially disposed with said output means, said input means further comprising:
   an annular magnetic armature having a threaded outer diameter;
   an annular adjustable friction ring member threadably mounted on said threaded outer diameter of said annular magnetic armature for relative motion therewith;
   a drive plate member coaxially disposed with said annular magnetic armature, said drive plate member further being mounted adjacent to said annular magnetic armature; and
   means for translating torque from said drive plate member to said annular adjustable friction ring member, said translating means further comprising:
   a plurality of spherical members interposed said annular adjustable friction ring member and said drive plate member, said plurality of spherical members adapted to simultaneously engage said drive plate member and said annular adjustable friction ring member to provide direct torque transmission to said output means; and
   clutch actuating means, for actuating said torque translating means, said clutch actuating means producing a circuitous flux path through said output means and said annular magnetic armature so as to transmit torque through said drive plate member, through said plurality of spherical members, and through said annular adjustable friction ring member to said output means, said clutch actuating means further comprising:
   electromagnetic means, mounted adjacent said output means, for producing a circuitous magnetic flux path when energized.

2. A torque transmitting device as claimed in claim 1, further comprising:
   biasing means interposed said annular magnetic armature and said output means, for urging said annular magnetic armature away from said output means.

3. A torque transmitting device as claimed in claim 1 wherein said drive plate member further comprises an inner diameter, an outer diameter, an inner diameter radial portion adjacent to said inner diameter, an outer diameter radial portion adjacent to said outer diameter, and a radially and axially extending portion between said inner and outer diameter radial portions, said radially and axially extending portion having portions defining a plurality of apertures formed therein to permit the periphery of said drive plate member to flex relative to said inner diameter portion.

4. A torque transmitting device as claimed in claim 1 further comprising:
   axial wear and thread retarder means, mounted to said annular magnetic armature, for biasing said annular magnetic armature toward said output means for preventing relative motion between said annular magnetic armature and said annular adjustable friction ring member in one direction of rotation and for permitting relative motion between said annular magnetic armature and said annular adjustable friction ring member in another direction of rotation as wear occurs between said annular adjustable friction ring member and said output means.

5. An electromagnetic torque transmitting device comprising:
   output means having portions of magnetic material;
   electromagnetic means, mounted adjacent to said output means, for producing a circuitous magnetic flux path through said portions of magnetic material when energized; and input means, coaxially disposed with said output means, said input means further comprising:
a drive plate member; and
means for transmitting torque from said input means to said output means, said torque transmitting means further comprising:
an annular armature member interposed said outut means and said drive plate member, said annular armature member further moving into engagement with said output means when said electromagnetic means is energized, said annular armature member havng a threaded outer diameter;
an annular friction ring member threadably mounted on said threaded outer diameter of said annular armature for relative movement therewith, said annular friction member having a frusto-conical outer friction surface tapering radially inward toward said output means to engage said output means;
means for biasing said annular armature in a direction away from said output means, said biasing means further flexing upon energizing and deenergizing said electromagnetic means; and
means for translating torque from said drive plate member to said annular friction ring member, said translating means further comprising:
a plurality of spherical members interposed said annular friction ring member and said drive plate member, said plurality of spherical members adapted to simultaneously engage said drive plate member and said annular friction ring member to provide direct torque transmission from said input means to said annular friction ring member through said plurality of spherical members.

6. A electromagnetic torque transmitting device as claimed in claim 5, further comprising:
axial wear and thread retarder means, mounted to said annular armature for biasing said annular armature toward said output means to prevent relative motion between said annular armature and said annular friction ring member in one direction of rotation when said electromagnetic means is operatively energized.

7. An electromagnetic torque transmitting device as claimed in claim 5 wherein said output means further comprises:
an annular inner member of magnetic material disposed coaxially with said input means;
an annular outer member of magnetic material mounted concentric to said annular inner member for rotation therewith; and
a ring member interposed said inner and outer members, said ring member having nonmagnetic properties to enable the formation of a magnetic flux path between said inner and outer members.

8. A torque transmitting electromagnetic device comprising:
an input shaft;
a drive plate member secured on said input shaft for rotation therewith, said drive plate member having a first face portion, said first face portion further having a first plurality of recesses of conical cross section;

output means concentrically disposed with said input shaft, said output means having a frusto-conical inner friction face tapering radially inward toward said input shaft, said output means further having a flat annular pole face disposed normal to the axis of said input shaft;
means, interposed said output means and said drive plate member, for translating torque from said drive plate member to said output means, said translating means further comprising:
an annular armature member coaxially disposed with input shaft, said annular armature member further being axially movable towards said output means, said annular armature member having a threaded outer surface;
an annular friction ring member coaxially disposed with said input shaft, said annular friction ring member having an inner diameter, a frusto-conical outer friction face tapering radially outward from said input shaft for frictionally engaging said frusto-conical inner friction face of said output means and an inner cylindrical threaded surface on said inner diameter, said threaded surface adapted to threadably engage said outer helical threaded surface on said annular armature member;
a flat annular flange extending radially inward from said inner diameter of said annular friction ring member, said flat annular flange having an opposite face portion disposed adjacent to but spaced away from said drive plate member, said opposite face portion having a second plurality of recesses of conical cross section disposed in opposing relationship with said first plurality of recesses in said drive plate member;
a plurality of spherical members disposed within said first plurality of conical recesses in said drive plate member and said second plurality of conical recesses in said flat annular flange;
biasing means for urging said annular armature member, said annular friction ring member and said plurality of spherical members away from said output means; and
means for actuating the electromagnetic device, said actuating means disposed coaxially with said input shaft, said actuating means further producing a circuitous magnetic flux path through said flat annular pole face of said output means and said annular armature member when said actuating means is energized so that said annular armature member is slidably moved into engagement with said flat annular pole face of said output means, said plurality of spherical members acting between said drive plate member and said annular friction ring member to create a direct coupling therebetween such that said frusto-conical outer friction face on said annular friction ring member frictionally engages said frusto-conical inner friction face of said output means to transfer torque therebetween.

9. A torque transmitting device as claimed in claim 8 wherein said frusto-conical inner friction face is a resilient material.

10. A torque transmitting device as claimed in claim 8 further comprising:
axial wear and thread retarder means, mounted to said annular armature member, for biasing said annular armature member towards said output means, for preventing relative motion between said annular magnetic armature and said annular adjustable friction ring in one direction of rotation and for permitting relative motion between said annular magnetic armature and said annular adjustable friction ring in another direction of rotation as wear occurs between said annular adjustable friction ring and said output means.

11. A torque transmitting device as claimed in claim 8 further comprising:
means, mounted in said drive plate member, for axially flexing said drive plate member in response to unsteady input torque and output torque so that backlash noise normally associated with said plurality of spherical members engaging said conical recesses is minimized.

* * * * *

UNITED STATES PATENT AND TRADEMARK OFFICE
CERTIFICATE OF CORRECTION

PATENT NO. : 4,416,359

DATED : November 22, 1983

INVENTOR(S) : Donald L. Miller

It is certified that error appears in the above-identified patent and that said Letters Patent is hereby corrected as shown below:

Column 2, line 7, delete the comma ",".

Column 2, line 62, delete "perimitted" and insert ---- permitted ----. Same line, delete "above" and insert ---- move ----.

Column 3, line 11, delete "face" and insert ---- fact ----.

Column 3, line 19, delete "effect," and insert ---- affect, ----.

Column 6, line 48, delete "the".

Column 6, line 66, delete the numeral "30".

Column 7, line 17, delete "ple" and insert ---- pal ----.

Column 7, line 19, delete "and" and insert ---- as ----.

Column 7, line 66, after the numeral "30", insert ---- and a second face 98 disposed opposite the first face 96 ----.

Column 8, line 4, delete "is" and insert ---- in ----.

Column 8, line 11, delete "frustoconically" and insert ---- frusto-conically ----.

UNITED STATES PATENT AND TRADEMARK OFFICE
CERTIFICATE OF CORRECTION

PATENT NO. : 4,416,359

DATED : November 22, 1983

INVENTOR(S) : Donald L. Miller

It is certified that error appears in the above-identified patent and that said Letters Patent is hereby corrected as shown below:

Column 9, line 41, delete "with", second occurrence, and insert ---- to ----.

Column 9, line 51, after "relative", insert ---- to ----.

Column 9, line 60, delete "preferrable and insert ---- preferable ----.

Column 10, line 31, after "adjacent to", insert ---- the ----. Same line, delete "on" and insert ---- of ----.

Column 10, line 40, delete "80" and insert ---- 90 ----.

Column 10, line 48, delete "armature opposite" and insert ---- second ----.

Column 10, line 49, delete "98 to bias" and insert ---- 98 of the armature plate member 90 to exert a biasing force ----.

Column 10, line 50, delete "on" and insert ---- of ----.

Column 10, line 55, delete the numeral "94" and insert ---- 105 ----.

Column 11, line 14, delete "bias" and insert ---- biasing ----.

UNITED STATES PATENT AND TRADEMARK OFFICE
CERTIFICATE OF CORRECTION

PATENT NO. : 4,416,359

DATED : November 22, 1983

INVENTOR(S) : Donald L. Miller

It is certified that error appears in the above-identified patent and that said Letters Patent is hereby corrected as shown below:

Column 11, line 38, delete "83, 103" and insert ---- 81 and 101, ----.

Column 12, line 25, delete "occurred" and insert ---- occurred ----

Column 12, line 50, delete "plate" and insert ---- ring ----.

Column 13, line 57, after "intended", insert ---- that ----.

In the Claims

Column 15, line 12, delete "havng" and insert ---- having ----.

Column 16, line 12, after "with", insert ---- said ----.

In the Abstract

In the second column of the abstract, line 26, delete "further" and insert ---- friction ----.

Signed and Sealed this

Twenty-first Day of August 1984

[SEAL]

Attest:

GERALD J. MOSSINGHOFF

Attesting Officer

Commissioner of Patents and Trademarks